United States Patent
Meyn

[11] Patent Number: 5,299,975
[45] Date of Patent: Apr. 5, 1994

[54] APPARATUS FOR CONVEYING ENTRAILS PACKAGES WHICH HAVE BEEN REMOVED FROM BIRDS

[75] Inventor: Cornelis Meyn, Oostzaan, Netherlands

[73] Assignee: Machinefabriek Meyn B.V., Oostzaan, Netherlands

[21] Appl. No.: 36,676

[22] Filed: Mar. 25, 1993

[30] Foreign Application Priority Data

Mar. 31, 1992 [NL] Netherlands .......................... 9200599

[51] Int. Cl.⁵ .............................................. A22C 21/00
[52] U.S. Cl. .................................... 452/177; 452/106; 452/182
[58] Field of Search ............... 452/177, 182, 183, 106, 452/117, 118, 112

[56] References Cited

U.S. PATENT DOCUMENTS

| Re. 32,402 | 4/1987 | Graham et al. | 452/117 |
|---|---|---|---|
| 2,210,377 | 8/1940 | Onorato et al. | 452/177 |
| 2,397,158 | 3/1946 | Savrda | 452/136 |
| 2,492,387 | 12/1949 | Lundell | 452/177 |
| 2,516,499 | 7/1950 | Albright | 452/177 |
| 2,590,291 | 3/1952 | Albright . | |
| 3,474,492 | 10/1969 | Viscolosi . | |
| 4,090,275 | 5/1978 | Jorgensen et al. | 452/182 |
| 4,467,498 | 8/1984 | Graham et al. . | |
| 4,546,520 | 10/1985 | Wenzel et al. | 452/117 |
| 4,616,381 | 10/1986 | Harris, Jr. . | |
| 4,813,101 | 3/1989 | Brakels et al. | 452/182 |

FOREIGN PATENT DOCUMENTS

| 264592 | 4/1988 | European Pat. Off. | 452/106 |
|---|---|---|---|
| 878957 | 10/1961 | United Kingdom | 452/177 |

Primary Examiner—Willis Little
Attorney, Agent, or Firm—Dority & Manning

[57] ABSTRACT

Apparatus for conveying entrails packages which have been removed from birds, comprising a conveyor for the entrails packages having a number of conveying means. Each conveying means is provided with a carrier which is pivotable between a lower position and an upper position. In the upper position the entrails packages can be applied to the carrier for the supply thereof to a separating device.

12 Claims, 2 Drawing Sheets

# APPARATUS FOR CONVEYING ENTRAILS PACKAGES WHICH HAVE BEEN REMOVED FROM BIRDS

BACKGROUND OF THE INVENTION

The present invention relates to an apparatus for conveying entrails packages which have been removed from birds, and more particularly to a conveyor system for conveying the entrails packages over some distance synchronously with the birds that are suspended from a suspension conveyor.

Dutch patent application 91.01768 describes a conveyor of the above mentioned type shaped as a belt conveyor. Using this belt conveyor, it is possible to convey the entrails over some distance entirely severed from the poultry but still synchronously conveyed therewith. As a result, it is completely clear during a veterinary inspection to which bird each entrails package belongs. During such an inspection a veterinary inspector is located on the side of the conveyor facing away from the suspension conveyor, such that the entrails packages and corresponding birds are visible at one glance. It is required, however, that the distance between the entrails packages and corresponding birds is minimal.

After the entrails packages and the birds have passed the veterinary inspection the entrails packages have to be separated in separate parts, such as intestines, liver and heart with lungs. This can be carried out using an apparatus as described in Dutch patent application 91.01856. Herein, the entrails packages, positioned on carriers having receiving slots, pass a separating device.

Basically, it is conceivable that the carriers according to Dutch patent application 91.01856 act as the conveyor for the entrails packages while passing the veterinary inspection. However, such carriers exhibit the disadvantage of hiding a part of the entrails packages at the side of the carriers facing away from the veterinary inspector. Thus, it is preferred to support the entrails packages in a lying condition, in correspondence with Dutch patent application 91.01484. However, a disadvantage is then that in such a situation the entrails packages cannot, without additional measures, be supplied to a previously mentioned separating device.

OBJECTS AND SUMMARY OF THE INVENTION

It is a principal object of the invention to provide an apparatus of the type referred to above providing on one hand a support of the entrails packages which is optimized in view for carrying out a veterinary inspection, and on the other hand enables the supply of the entrails packages to a separating device known per se.

Additional objects and advantages of the invention will be set forth in part in the description which follows, and in part will be obvious from the description, or may be learned by practice of the invention.

Thus the apparatus according to the invention is characterized in that the conveyor comprises a number of conveying means each receiving one single entrails package, which at their side facing the birds are provided with carriers for receiving the entrails packages and for in a defined position supplying these to an entrails processing apparatus. The carriers are movable between a lower position in which they extend mainly below the level of support of the conveying means and an upper position in which they extend mainly above the level of support of the conveying means.

In an appropriate way the conveying means may be carried out such that the entrails packages lying thereupon are optimally visible during a veterinary inspection. The carriers, which in a way known per se may comprise slots (as illustrated in Dutch patent application 91.0856), in their lowermost position do not at all obstruct a veterinary inspection. That is, the carriers do not obstruct the view of birds behind the conveyor which are suspended form the suspension conveyor. Further, they do not limit the accessibility to the birds, for example, if a veterinary inspector does want to remove some kind of irregularities, such as feathers, from a bird. In this position of the carriers, the conveying means are capable of a synchronous movement with the birds at a minimal distance therefrom without obstructing the view of said birds, such that it is completely clear to which bird each entrails packages belongs.

After passing the veterinary inspection, the carriers are in the upper position and the entrails packages can be positioned in the carriers in an appropriate way and in this position be supplied to the separating device. The positioning into the carriers can occur manually, or be automated.

In a preferred embodiment of the apparatus according to the invention, each carrier is rotatable about a horizontal axis of rotation extending transversally to the direction of conveyance. For assuming the lower position or upper position, respectively, the carriers can be pivoted about the respective axis of rotation in an appropriate way.

For pivoting the carriers, several constructive solutions are possible. One preferred embodiment of the apparatus is characterized in that a stationary guide is provided underneath the conveyor engaging the carriers and causing the rotation thereof. Initially the carriers assume the lower position under influence of the force of gravity. After reaching the stationary guide the carriers are automatically pivoted towards their upper position and maintained therein, for example until after passing the separating device.

In correspondence with another embodiment of the apparatus according to the invention it is preferred that the conveying means includes trays, which for defining the conveyor are articulated about horizontal transverse axes. In such a case, the conveyor consists of an endless series of trays interconnected through horizontal transverse axes. Of course the trays should have such a shape that they can follow the track run through by the conveyor, for example around two distanced reversal wheels.

When the conveyor, in the way described above, comprises trays interconnected through transverse axes, it is, in correspondence with another embodiment of the apparatus according to the invention preferred that the transverse axes coincide with the axes of rotation of the carriers. Thus, the axes have a double function.

Hereinafter the invention will be elucidated further while referring to the drawing, in which an embodiment of the apparatus according to the invention illustrated.

DESCRIPTION OF THE PREFERRED EMBODIMENTS

Figure 1:
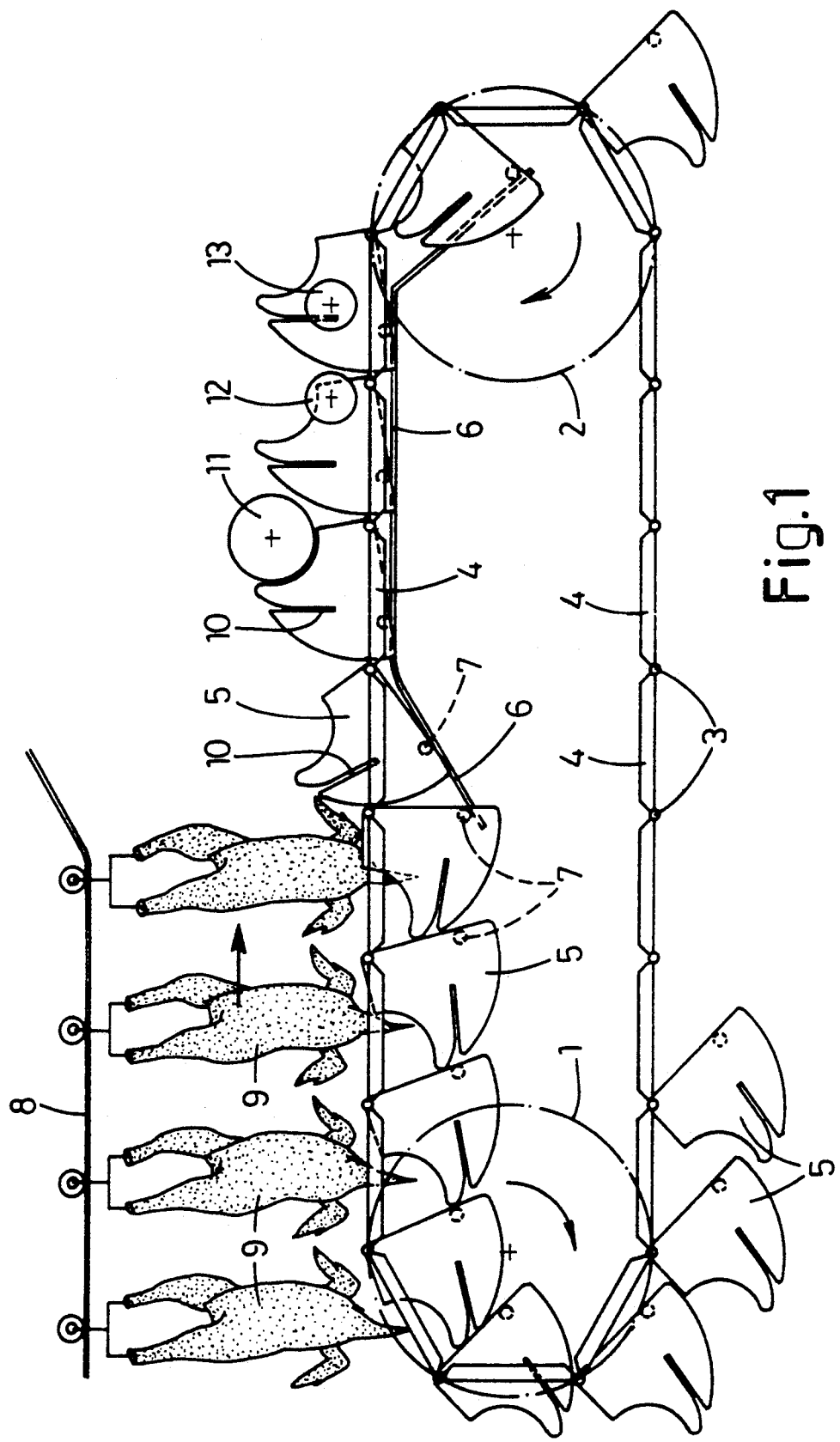
FIG. 1 shows schematically a side elevational view of an embodiment of the apparatus according to the invention.

Reference will now be made in detail to the presently preferred embodiments of the invention, one or more examples of which are illustrated in the accompanying drawings. Each example is provided by way of explanation of the invention, not limitation of the invention. The numbering of components in the drawings is consistent, with the same components having the same number in each drawing.

In FIG. 1 two reversal wheels 1, 2 are shown positioned in a vertical plane and around which an endless conveyor extends comprising trays 4 interconnected through horizontal transverse axes 3.

The transverse axes 3 interconnecting the trays 4 further act as axes of rotation for carrying plates 5 connected with the trays 4. Generally the carrying plates 5 will assume a lower position (as indicated in the left of FIG. 1) under influence of the force of gravity, in which they extend mainly below the level of the conveyor, especially of the corresponding tray 4.

Underneath a part of the conveyor a stationary guide 6 is provided, which, in the illustrated embodiment, cooperates with extensions 7 provided on the carrying plates 5. When an extension 7 contacts the guide 6 the respective carrying plate is pivoted upwards to the position shown on the right top of FIG. 1 relative to the respective tray 4 and opposite to the force of gravity.

Further, it is indicated in FIG. 1 that in the vicinity of the conveyor a suspension conveyor 8, only indicated schematically, is provided from which birds 9 are suspended. The position of the suspension conveyor is chosen such that the birds 9, as seen perpendicularly to the plane of the drawing, are positioned closely behind the conveyor comprising the trays 4.

The apparatus represented in FIG. 1 operates as follows. In a previous stage the entrails packages have been removed from the birds 9 in a way not illustrated and known per se. By means of an appropriate apparatus, for example the apparatus described in Dutch patent application 91.01768, the entrails packages are positioned into the trays 4 of the conveyor. Next, the trays 4 comprising the entrails packages lying therein together with the birds 9 move over some distance synchronously from left to right in FIG. 1. During the synchronous movement, the entrails packages are close the respective birds from which they have been removed. Further, the carrying plates 5 are in their lower position such as not to obstruct the view of the birds 9. In this way a veterinary inspector on one hand may inspect the entrails packages lying in the trays 4 and on the other hand may inspect the entrails packages lying in the trays 4 and on the other hand may check the birds 9 for irregularities. Further, the birds 9 are easily accessible for the veterinary inspector, such that possible irregularities can be removed or, if an entrails package gives cause to it, a bird 9 is taken away from the suspension conveyor 8.

Therefore it is important that in the left section of the upper part of the conveyor represented in FIG. 1, the distance between the trays 4 and the birds 9 suspended from the suspension conveyor 8 is as small as possible. Notwithstanding the small distance between the trays 4 and the birds 9 the carrying plates 5 do not constitute an obstruction for they are in their lower position at the moment of passing a veterinary inspector.

During the ongoing movement of the trays 4 in FIG. 1 from left to right, the extensions 7 of the carrying plates 5 contact the rising guide 6 and the carrying plates 5 are rotated from their lower position towards their upper position in which they extend above the trays 4. At this moment the entrails packages are manually or automatically positioned in appropriate receiving slots 10 of the carrying plates 5. Positioned thus, the carrying plates 5 together with the entrails packages received therein finally pass a device for separating the separate parts of the entrails package comprising parts 11-13 indicated only schematically.

After passing the separating device 11, 12, 13 the guide releases the carrying plates 5 and these pivot towards their lower position and, together with the corresponding trays 4, move back to the starting position after passing the reversal wheel 2, in which starting position the trays 4 may again receive entrails packages.

Figure 2:
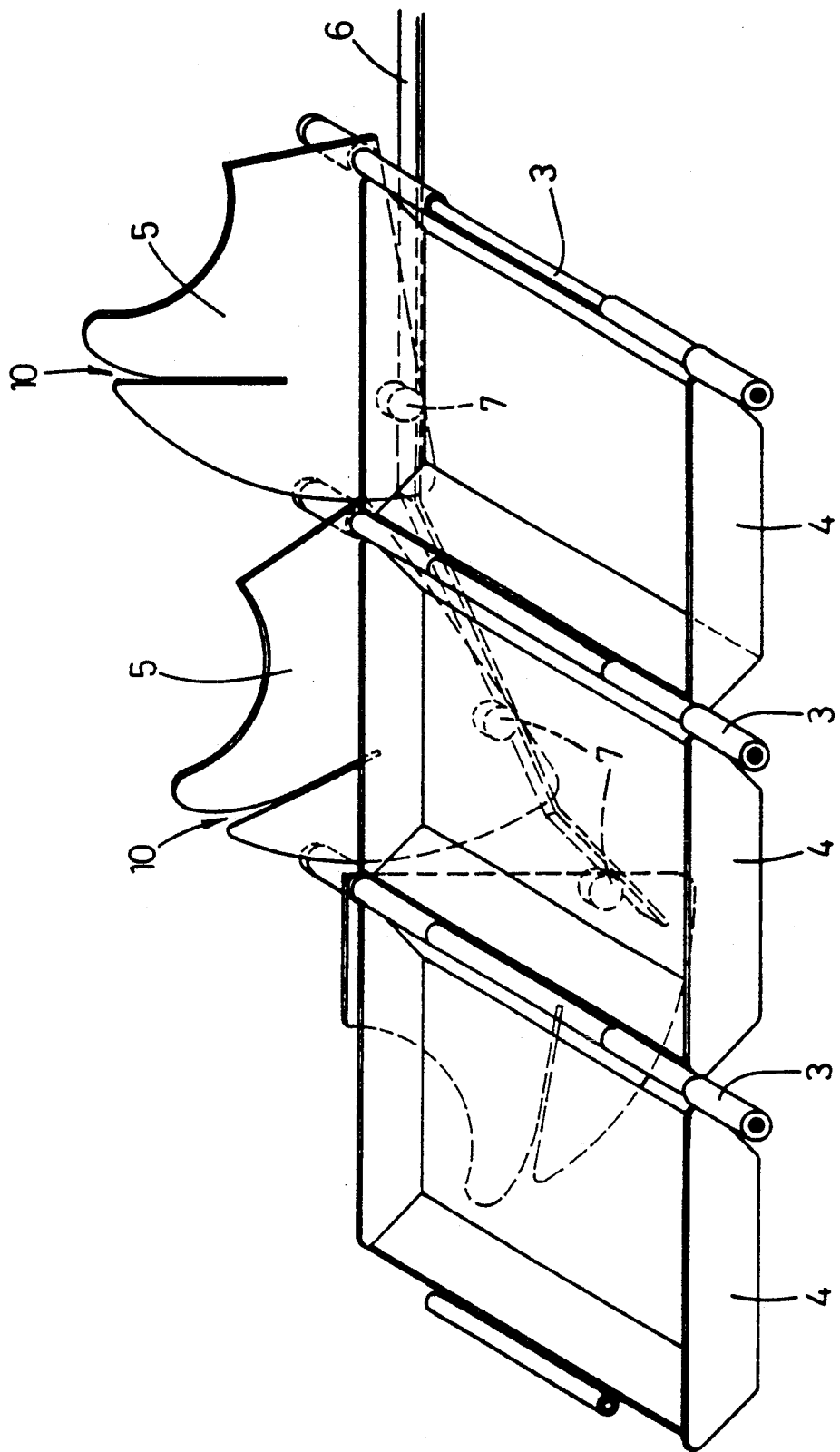
FIG. 2 shows on a larger scale and perspectively a part of the conveyor illustrated in FIG. 1.

In FIG. 2 three trays 4 are indicated which, through transversally extending horizontal axes 3, are articulated. There transverse axes 3 further act as mounting and rotational axes for the carrying plates 5. The carrying plates 5 are provided with the extensions 7 mentioned before which, for rotating the carrying plates 5, engage the stationary guide 6.

The shape of the trays 4 is such, more specifically trapezial, that they can pass the reversal wheels 2 while acting as conveying means.

The invention is not limited to the embodiment described before which may be varied widely within the scope of the invention. For example, it is conceivable that instead of a stationary guide 6 for moving the carrying plates 5 from the lower towards the upper position, selectively activatable actuator means are applied. Further it is possible that the carrying plates comprise follower rolls cooperating with a stationary curved track. In fact, it be apparent to those skilled in the art that various modifications and variations can be made in the present invention without departing from the scope or spirit of the invention. Thus, it is intended that the present invention cover such modifications and variations as come within the scope of the appended claims and their equivalents.

I claim:

1. A conveying apparatus for conveying entrails packages which have been removed from poultry, wherein along a first section of said apparatus the entrails packages are unobstructed from view and along a second section of said apparatus the entrails packages can be readily separated, said apparatus comprising:

a conveyor means for receiving the entrails packages from birds conveyed thereabove and maintaining the entrails packages for individual birds separate, said conveyor means conveying the entrails package along a predetermined conveying length;

a plurality of pivotal entrails carrier members operably associated with said conveying means, said carrier members being movable between a lower position generally below the conveying level of said conveying means, and an upper position generally above the conveying level of said conveying means; and means for raising and lowering said carrier members relative said conveying means at predetermined positions along said conveying length.

2. The apparatus as in claim 1, wherein said conveying means comprises a plurality of articulably connected conveying devices forming an endless conveyor, each said conveying device configured to receive and convey an entrails package from a single bird.

3. The apparatus as in claim 2, wherein said conveying means comprise trays articulably connected end-to-end about generally horizontal axes transverse to the conveying direction of said conveyor.

4. The apparatus as in claim 1, wherein said carrier members are articulable relative said conveying means about a horizontal axis transverse to the conveying direction of said conveyor.

5. The apparatus as in claim 2, wherein said carrier members extend above said conveying devices in said upper position generally at the side of said conveying devices.

6. The apparatus as in claim 2, wherein said carrier members extend generally through said conveying devices in said upper position.

7. The apparatus as in claim 1, wherein said carrier members comprise slots defined therein for receiving the entrails packages.

8. The apparatus as in claim 1, further comprising separating devices disposed generally along said second section of said apparatus, said separating devices cooperating with said carrier members to separate the parts of said entrails packages.

9. The apparatus as in claim 1, wherein said raising and lowering means comprises a guide member disposed generally below the level of said conveying means, said guide member configured to engage said carrier members conveyed thereabove thereby raising said carrier members to said upper position, said guide member maintaining said carrier members in said upper position along a portion of said predetermined conveying length, said guide member repositioning said carrier members to said lower position after said upper position portion of said conveying length.

10. The apparatus as in claim 9, wherein said carrier members further comprise extensions for contacting said guide member.

11. The apparatus as in claim 9, wherein said carrier members generally hand from said conveying means in said lower position by way of gravity.

12. The apparatus as in claim 9, wherein said guide member has oppositely inclined end portions for guiding said carrier members into said upper and lower positions.

* * * * *